E. Ronning,
Preserving Milk.

No. 111,476.      Patented Jan. 31, 1871.

Attest
A. Ruppert
P. J. Boland

Even Rönning
Inventor
by C. F. Clausen
his Atty.

United States Patent Office.

EVEN RÖNNING, OF BRODHEAD, WISCONSIN.

Letters Patent No. 111,476, dated January 31, 1871.

---

IMPROVEMENT IN APPARATUS FOR PRESERVING MILK.

---

The Schedule referred to in these Letters Patent and making part of the same.

---

*To all whom it may concern:*

Be it known that I, EVEN RÖNNING, of Brodhead, in the county of Green and in the State of Wisconsin, have invented a new and useful Improvement in Apparatus for Preserving Milk; and I do hereby declare the following to be a full, clear, and exact description of the same, reference being had to the accompanying drawing making a part of this specification, in which—

The same letters of reference employed in the several figures indicate identical parts.

Figure 1:
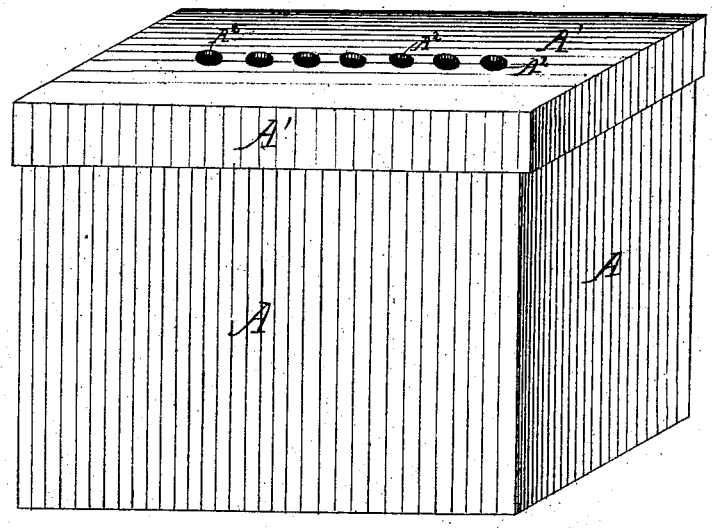
Figure 1 is a perspective view of the reservoir containing the milk-cans.
Figure 2:
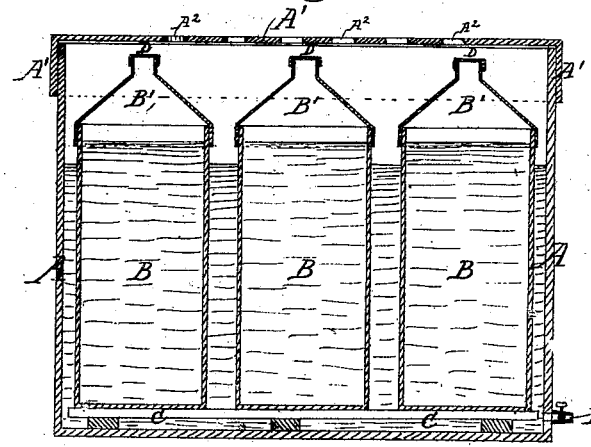
Figure 2 is a longitudinal section.

The nature of my invention consists in the construction of a receptacle into which milk-cans are placed. The receptacle is partly filled with water, and its cover provided with apertures, through which air is admitted.

The lids of the cans containing the milk are also perforated, or provided with wire-gauze, through which air contained in the receptacle may be introduced.

To enable others skilled in the art to make and use my invention, I will proceed to describe its construction and operation.

A is a rectangular vessel, made of wood, sheet metal, or of any suitable material.

A′ is a cover fitting snugly over the vessel, and is at its upper surface provided with apertures A″.

B B are milk-cans, of a cylindrical form, the height of which is about one-third larger than the diameter.

B′ forms the lid of the can. It is tapered off toward the top, and provided with a neck or throat, over which wire-gauze D is placed.

The cans B B rest on a platform, C, made of slats, and placed on the bottom of the receptacle A.

The milk to be preserved is strained, and then emptied into the cans, which are placed in the receptacle A and surrounded by cold water.

I am aware that it is a well-known method to place milk-cans in air-tight or entirely open receptacles containing water, in order to preserve the milk; but, in order that milk shall preserve its freshness, taste, &c., fresh air ought not to be entirely excluded from it.

My improvement consists in the introduction of a limited quantity of air, which is cooled in the receptacle A, containing the cold water, before it enters the milk-cans and comes in contact with the milk to be preserved.

Claim.

Having thus described my invention,

What I claim, and desire to secure by Letters Patent, is—

The water-tight receptacle A, having faucet E, perforated cover A′, and raised open platform C, in combination with the cans B B, provided with wire-gauze D, all arranged as described, for the purpose of preserving milk, as specified.

In testimony whereof I have signed my name to this specification in the presence of two subscribing witnesses.

EVEN RÖNNING.

Witnesses:
PAUL A. DAHL,
OLE N. LOFTHINES.